United States Patent [19]

Furukawa et al.

[11] Patent Number: 4,641,295

[45] Date of Patent: Feb. 3, 1987

[54] DISC PLAYBACK APPARATUS

[75] Inventors: Shunsuke Furukawa; Tadao Suzuki, both of Tokyo, Japan; Marinus J. B. M. Monen, Colorado Springs, Colo.

[73] Assignee: Sony Corporation, Tokyo, Japan

[21] Appl. No.: 644,265

[22] Filed: Aug. 27, 1984

[30] Foreign Application Priority Data

Sep. 1, 1983 [JP] Japan .................................. 58-161514

[51] Int. Cl.⁴ .............................................. G11B 21/10
[52] U.S. Cl. ......................................... 369/32; 369/59
[58] Field of Search ................... 360/32, 33.1, 24, 22; 369/30, 32, 59; 358/328, 342

[56] References Cited

U.S. PATENT DOCUMENTS

| | | | |
|---|---|---|---|
| 4,094,013 | 6/1978 | Hill et al. .............................. | 369/32 |
| 4,224,642 | 9/1980 | Mawatari et al. ..................... | 360/32 |
| 4,389,681 | 6/1983 | Tanaka et al. ......................... | 369/59 |
| 4,463,387 | 7/1984 | Hashimoto et al. ................... | 360/32 |
| 4,488,278 | 12/1984 | Dieterich ............................. | 358/342 |
| 4,534,031 | 8/1985 | Jewer .................................... | 369/59 |
| 4,535,439 | 8/1985 | Satoh et al. ........................... | 369/32 |
| 4,541,093 | 9/1985 | Furuya et al. ......................... | 369/59 |
| 4,549,227 | 10/1985 | Hashimoto et al. ................... | 360/32 |
| 4,587,643 | 5/1986 | Monen et al. ......................... | 369/32 |

*Primary Examiner*—Donald McElheny, Jr.
*Attorney, Agent, or Firm*—Lewis H. Eslinger; Alvin Sinderbrand

[57] ABSTRACT

Apparatus permits the use of a compact audio disc to provide digital data information other than audio signals without requiring a change of format of the audio disc and involving only minor changes to existing digital audio disc playback apparatus. Data signals are rearranged to permit searching of the data information in a fashion compatible with existing digital audio disc playback apparatus and maintaining consistency with respect to signal format and signal processing, such as error correcting and recording data format presently used in compact digital audio discs.

24 Claims, 5 Drawing Figures

DISC PLAYBACK APPARATUS

BACKGROUND OF THE INVENTION

1. Field of the Invention

This invention relates generally to a digital disc playback apparatus of the kind having a digital disc on which two-channel digital audio signals are recorded and, more particularly, to a disc playback apparatus in which digital data other than the audio signals are recorded thereon and are utilized upon playback.

2. Description of the Prior Art

A system employing an optically encoded digital audio disc, which has become known as a compact audio disc or a digital audio disc, is known to reproduce high quality stereophonic musical signals. In such systems, the audio data is recorded generally as pits in the surface of the record, and the data is read out by a laser device in the playback system. Presently, only audio information has been encoded on such discs, however, it is contemplated that data representing characters, display data, program data, or data other than conventional stereophonic audio signals could also be reproduced by such optical digital audio disc system. Moreover, it would appear that it would be advantageous if such data other than audio information could be reproduced without extensive modifications to the present disc playback system. For example, it would be beneficial if it were possible to realize playback apparatus to reproduce visual information, such as charts, statistics, and graphs, as well as pictorial illustrations such as still pictures or video games simply by adding a suitable visual display unit to the playback apparatus. In this fashion, the compact disc system would provide a wide range of applications beyond the present audio applications.

These uses other than audio might also be obtained by using flexible magnetic discs, known as "floppy discs", however, the memory capacity of such discs is not large. The data memory capacity currently available in compact audio disc is around 500 megabytes, and this capacity is much greater than the memory capacity of a standard flexible memory disc, thereby providing great advantages to a system employing a compact audio disc as the memory.

On the other hand, because the compact discs have been principally developed and utilized solely for the reproduction of audio signals, the capability of searching on the disc for relative large informational units, such as musical programs, is coarse. That is, the beginning of the data on the disc is searched on a relatively large basis for large information units, such as music program segments. This is in conflict with the requirements relative to other uses, which must be read out and identified on a much smaller unit basis, for example, on the order of 128 bytes to ten kilobytes. This presents a distinct problem in attempting to use the compact disc for purposes other than recordation of stereophonic audio signals.

OBJECTS AND SUMMARY OF THE INVENTION

Accordingly, it is an object of the present invention to provide disc playback apparatus for playing back digital data other than stereophonic audio data that can eliminate the above-noted defects inherent in the prior art.

Another object of this invention is to provide disc playback apparatus that can read out digital signals of program data or the like in place of digital audio signals by utilizing standard digital audio playback apparatus without modification.

A further object of this invention is to provide disc playback apparatus that can read out digital signals of information and programs other than digital audio signals by utilizing standard digital audio playback apparatus that requires only a slight modification of a small portion thereof.

In accordance with an aspect of the present invention, digital disc playback apparatus is provided employing a disc in which main digital data and subdigital data have been recorded in which the subdigital data is used to selectively reproduce the main digital data, whereby a plurality of frames of a number determined as an integral factor of a unit of change of the subdigital data are set to one block of the main digital data, and the disc on which digital addresses corresponding to each of the blocks have been added is then played back.

The above and other objects, features, and advantages of the present invention will become apparent from the following detailed description of illustrative embodiments thereof to be read in conjunction with the accompanying drawings.

DESCRIPTION OF THE PREFERRED EMBODIMENT

Figure 1:
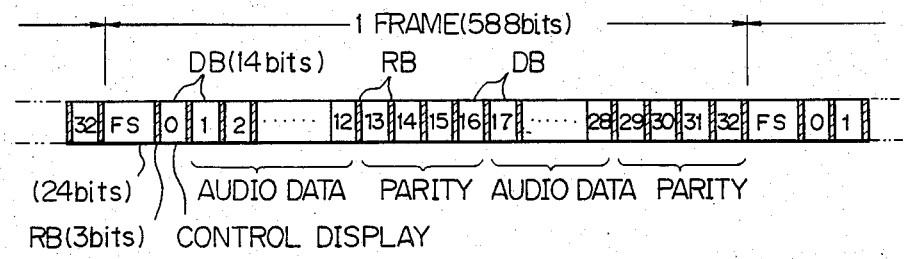
FIG. 1 is a schematic representation of the data arrangement as recorded on a compact disc to which the present invention is applied.
Figure 2:
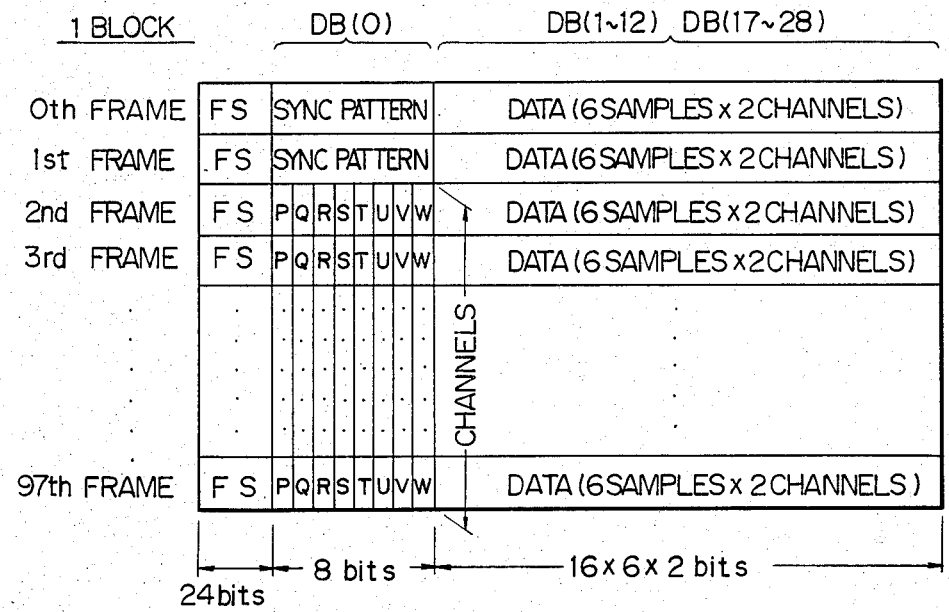
FIG. 2 is a schematic representation of the data of FIG. 1 having been rearranged in a parallel manner.

The present invention is directed to a compact disc of the kind typically employed to record stereophonic audio signals, and FIGS. 1 and 2 show the data arrangement of the signals to be recorded on such compact digital disc. More specifically, referring to FIG. 1, a serial data stream as recorded on a compact disc is represented. In such data stream one FRAME consists of 588 bits of record data, and each frame has at its head end frame sync pulses FS that have a specific, predetermined bit pattern. Following the frame sync pulse pattern FS is a group of DC-restriction bits RB, in this case there are three bits in group RB. Following the initial 3-bit DC-restriction bits RB there are the 0th to 32nd data bit groups DB, each comprising 14 bits per group, with the 3-bit DC-restriction bits RB being alternately recorded with the data bit groups DB so as to be arranged therebetween. The 0th data bit group DB is referred to as a subcoding signal and is used to control the playback of the recorded disc and to display information relating thereto such as the program number. For this reason, this subcoding signal occurring in the 0th group of bits DB is also referred to as user's bits. Subsequently, the 1st–12th and 17th–28th data bit groups DB are assigned for audio data in the main channel. The remaining 13th–16th and 29th–32th data bit groups DB are assigned for parity utilized in the error correction coding in the main channel. Each of the data bit groups DB consists of 14 bits, which have been derived by converting the 8-bit data into 14 bits utilizing the known 8-14 conversion process during the recording.

Referring now to FIG. 2, one BLOCK is shown having been formed of 98 FRAMEs that were serially arranged and are now rearranged sequentially in parallel. In FIG. 2, the data bit groups DB are shown as consisting of 8-bits and the DC-restriction bits normally provided between the data bits are excluded. In the 0th and 1st frames the subcoding signals P-W in the 0th data group DB form sync patterns having predetermined bit arrangements. More typically, in the Q channel the cyclic recirculating check (CRC) code for error detection and correction is inserted in the last 16 FRAMEs of the 98 FRAMEs making up the BLOCK of FIG. 2.

The P channel in the subcoding signal commencing at the second FRAME of the BLOCK is a flag to indicate the music program and also to indicate the pause in between the successive music programs. Thus, the P channel has a lower level during the presence of the music program segment and then a high level during the pause located in between the music program segments. The P channel also has pulses of 2-Hz period during the lead-out section of the music program, that is, at the end of each program segment. Accordingly, it is possible to select and playback a specified music program segment out of all of the available music program segments by detecting and counting the signal appearing in the P channel of the subcoding signal. The Q channel is also available to provide somewhat more complicated control of this kind, for example, the Q-channel information can be stored in the microcomputer typically found in all compact audio disc playback apparatus and it is then possible to shift quickly from one music program to another, even during the playback of a particular music program segment. In this fashion, the recorded music program segments may be selected at random. The remaining channels in the subcoding signal, R through W, can be utilized to provide explanatory material in the form of spoken words relating to information concerning the author of the work or the composer or explanations or poetry or other similar materials related to the musical program segments recorded on the disc.

Referring now again to the Q channel, that includes 98 bits, the first two bits thereof are utilized in the sync pattern as discussed above relative to the 0th and 1st FRAMEs and the next four bits in the subsequent FRAMEs are address bits relative to the particular BLOCK and the subsequent 72 bits are then data bits. Finally, a CRC code is added at the remaining six bits and is utilized for error detection and correction. In the 72 bits forming the data bits, a track number code TNR and an index code X are included and these codes can vary from 00 to 99. Also included in the 72 data bits in the Q channel is a time indication code representing the time duration of each of the musical program segments and pauses and also in the Q channel is a time indication code representing the absolute time duration which will continuously change from the beginning to the end of the program material on the compact disc. It should be noted that in the compact disc the beginning of the program material is at the inner most radius and the end of the program material is at the outer most radius, contrary to phonographic records. Again, these time indication codes in the Q channel data bits are two digit codes and represents minutes, seconds, and FRAME. A time scale of 75 FRAMEs per second is selected. As indicated above this time scale in which one second is divided into 75 FRAMEs is possibly too coarse or gross to permit accessing the compact disc as required for use with digital data. That is, there must be a shorter unit basis or time scale for use in digital data than that which is typically used for music.

Figure 3:
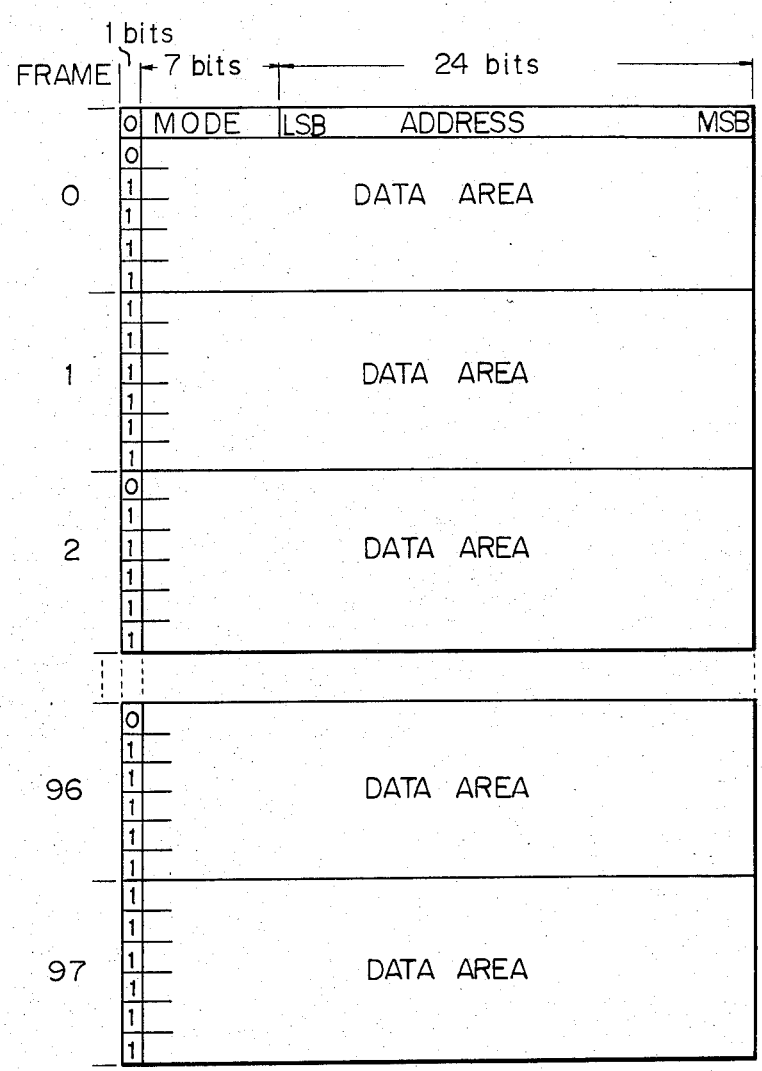
FIG. 3 is a schematic representation showing the arrangement of one BLOCK upon recording the digital data in an embodiment of the present invention.

The present invention then serves to provide the proper time basis so that access can be made with greater resolution. As described above, typically a minimum unit of change of a subcoding signal for a compact disc is 98 FRAMEs. Referring then to FIG. 3 there is shown the case of recording digital signals other than stereophonic music signals and one BLOCK of such data signals are represented in FIG. 3 as comprising a length of 98 FRAMEs, from the 0th to the 97th FRAME. As indicated above, typically one FRAME of digital audio data consists of 12 words and thus, following conventional practice this means that digital data of 24 bytes can be inserted in one FRAME. According to the arrangement shown in FIG. 3, each FRAME consists of 6 ROWs, and one ROW of contains 32 bits of one sample of audio data in the left channel (L) and 32 bits one one sample of audio data in the right channel (R) and, thus, a data word for each channel would then be in that row.

A one-bit sync bit is placed at the beginning of each 32 bit ROW, and in the 0th FRAME the first two ROWs are commenced with a "0" value in the sync bit position. According to the present invention, the sync bits appearing at the first bit position of the first ROW of all of the even-numbered FRAMEs have a "0" value, whereas the sync bits commencing the first 32 bits in the odd-numbered FRAME have a "1" value. Accordingly, these sync bits enable the detection of the head location of the BLOCK on a 98-FRAME unit basis, due to the two successive "0" bits in the first and second ROWs of the first FRAME of the BLOCK.

According to the present invention one BLOCK consists of 2352 bytes (24 bytes × 98 FRAMEs). In this fashion when two kilobytes, which actually comprise 2048 bytes, is inserted into one BLOCK, 304 bytes will remain. Of the remaining 2432 bits (304 bytes), 588 bits (6 × 98) are used as sync bits and a 7-bit mode signal and a 24-bit address signal are inserted in the first 32 bits in the 0th FRAME, so that 1813 bits will remain in each BLOCK for other use. These 1813 bits can be assigned to redundant bits when the error detection and correction coding processing is performed on the data contained within that one BLOCK. More specifically, of the remaining 2432 bits, 588 bits are used as sync bits and a 7-bit mode signal and the 24-bit address signal are arranged in the first ROW of the 0th frame, leaving the remaining 1813 bits available.

The 7-bit mode signal specifies the kind of data which is contained within the BLOCK, for example, the mode signal may be used to discriminate or to identify character data, still picture, or program code data, and the 24-bit address signal specifies the address of the data in the BLOCK. According to the present invention, by setting the sync bits of the FRAMEs having even numbers equal to "0" the present invention thereby permits arrangement of a data BLOCK on a two-FRAME unit basis. In such BLOCK having a two FRAME size, it will be necessary to add a mode signal and an address signal to each BLOCK. Nevertheless, in the case of a BLOCK having a length 98 FRAMEs, as discussed herein, the codes for indicating the absolute time duration of the P data and Q data of the subcoding signal in the same BLOCK are identical.

Accordingly, by providing digital data signals in the format shown in FIG. 3 such digital data signals can be recorded on a compact disc in the same manner as audio signals are presently recorded on an audio compact disc. Of course, by recording such signals in the same fashion they can also be read out in the same fashion. For example, in recording, a digital signal to be recorded is supplied to the input of a digital audio processor and the digital signal is converted into a video signal format and ultimately recorded using a rotary head video tape recorder (VTR). In such case, table of contents (TOC) data used to generate the subcoding signal is preliminarily recorded on the audio track on the magnetic tape on which the digital signal will ultimately be recorded. Next, this table of contents data is reproduced from the magnetic tape and is supplied to a subcoding generator and the reproduced digital signal is supplied to an encoder. The subcoding signal is also supplied to the encoder and a laser beam is modulated by the encoder output signal and used to form a master disc for use in reproducing a number of the discs. The formation of the pits in the master disc by a laser beam is a well-known process.

Of course, other methods are available for recording such digital signals, for example, a hard disc memory could be accessed at high speed by a minicomputer and the digital signal then fed in real time to the encoder of the laser-beam, master-discs, cutting system.

Figure 4:
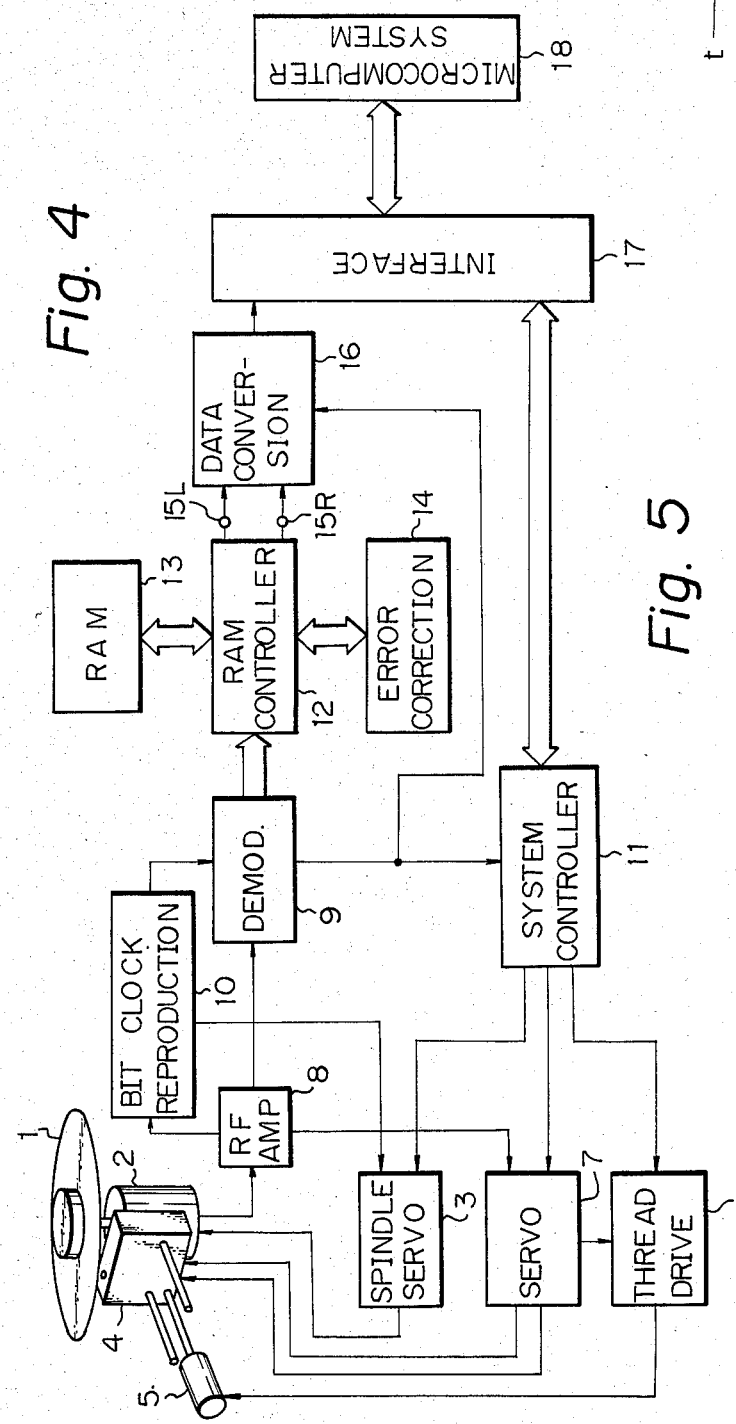
FIG. 4 is a block diagram showing an overall arrangement of one embodiment of digital disc playback apparatus according to the present invention.

FIG. 4 represents one embodiment of the present invention, in which compact disc 1 has a digital signal in the above-described format recorded as a spiral track. Compact disc 1 is rotated in the known fashion by spindle motor 2, which is controlled by spindle servo circuit 3, so that compact disc 1 is caused to rotate at a constant linear velocity, it being understood that this involves a varying of the angular velocity. Optical head 4 employs a laser source for generating a laser beam to accomplish the pick-up of the information, and optical head 4 would typically include an objective lens and a photo receiving device for receiving the modulated laser beam reflected by compact disc 1. In the known arrangement, optical head 4 is moved radially along the compact disc 1 by motor and threaded shaft 5, which involves a lead screw that is rotated by the motor along which a nut attached to the head travels, and thread feed motor 5 is controlled and driven by thread drive circuit 6. Optical head 4 can be deflected both in a direction perpendicular to the record surface of compact disc 1 and in a direction parallel thereto, to accomplish focusing and tracking. A focusing and tracking servo circuit 7 provides necessary signals to tracking head 4 to accomplish the focusing and tracking. More specifically, optical head 4 is typically provided with a focus error detecting system consisting of a combination of a cylindrical lens and a four-segment detector and a tracking error detecting system typically employing three laser spots, so that optical head 4 will also produce focus error and tracking error signals. The total output signal from optical head 4 is fed as an input to radio frequency (RF) amplifier 8, and the above-described focus and tracking error signal is fed through RF amplifier 8 as an input to focus and tracking servo circuit 7. Another output signal of RF amplifier 8 is fed to a digital demodulator and still another output signal is fed through RF amplifier 8 to bit clock reproduction circuit 10.

In this embodiment, the digital signal recorded on compact disc 1 has been modulated according to the EFM system, EFM modulation being a known method of block converting 8-bit data into data of more bits, preferably 14 bits, and in this case a 14-bit length provides a long minimum inverting time period of the modulated signal, in order to reduce low-frequency components. Accordingly, digital demodulator 9 provides EFM demodulation of the reproduced signal. The bit clock signal, which is obtained by bit clock reproduction circuit 10, is fed also to digital demodulator 9 and also to spindle servo circuit 3, in order to obtain proper timing of both the demodulation and of the angular velocity of compact disc 1.

Digital demodulator 9 operates to separate the subcoding signal, described in detail hereinabove, and this separated subcoding signal is fed to system controller 11, which includes a central processing unit (not shown) and controls the rotational operation of compact disc 1, the motor thread drive operation and the reading operation of optical head 4, among other things. System controller 11 also communicates by way of control commands through interface unit 17 with microcomputer system 18, which will be described in more detail hereinbelow. Basically, then the reading operation of the desired digital signal from compact disc 1 is controlled by system controller 11 using the subcoding signal recorded on compact disc 1.

The main digital data output signal from digital demodulator 9 is fed through random-access memory (RAM) controller 12, to random-access memory (RAM 13) and also to error correction circuit 14. The RAM controller 12, RAM 13, and error correction circuit 14 process the demodulated data signal to eliminate variations in time-base error, and to perform error correction and error interpolation so that the main digital data is then provided at terminals 15L and 15R of RAM controller 12. In systems in which audio information has been recorded on compact disc 1, during playback a digital-to-analog convertor would be connected to each of output terminals 15L and 15R, in order to convert the digital information reproduced from the disc into analog signals to be fed through the appropriate amplifying system. In the embodiment shown in FIG. 4, which is directed specifically to data other than audio signals, no digital-to-analog convertor is provided and the reproduced digital data are fed directly to data convertor 16. Also fed to data conversion unit 16 is the subcoding signal derived by digital demodulator 9. Data conversion unit 16 operates to convert parallel input data to serial output data which is also fed to interface unit 17.

The data for system controller 11 is supplied from microcomputer system 18 through interface unit 17 to system controller 11, and microcomputer system 18 specifies read out address and applies control signals, such as start signals, in addition to read-out address through interface 17 to system controller 11. More specifically, a list of a number of recording areas is recorded in the lead-in track in the inner most radial section on compact disc 1 using the subcoding signal as addresses, and this list is reproduced in the initial state to start the read out of compact disc 1 and is read by microcomputer system 18.

Figure 5:
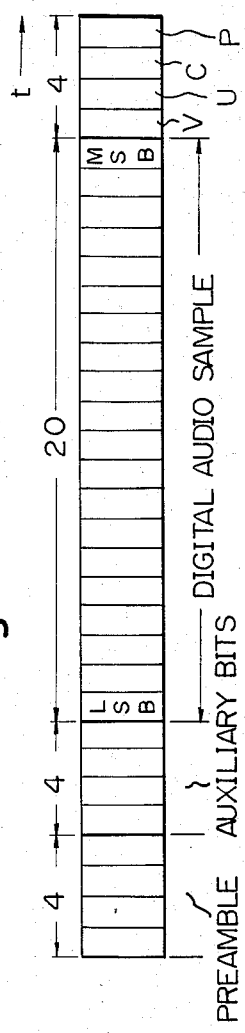
FIG. 5 is a schematic representation of the format of one word of the serial data in the embodiment of the present invention.

An example of the word format used in the serial output signal from data convertor 16 is shown in FIG. 5. In this serial signal one word includes 32 bits with the first four bits being used for a preamble, the next four bits being used for auxiliary audio data, and the next four bits for the actual digital audio sample. When the digital audio sample requires only 16 bits, the 16 bits are inserted starting at the least significant bit (LSB), which is at the end of the digital audio sample closer to the auxiliary bits. Finally, at the end of the word, four bits are available and the first bit V is a flag indicating whether the digital audio sample is effective or not, bit U represents each bit of the subcoding signal, bit C identifies the appropriate channel and bit P is a parity bit. In regard to bit P, this bit of the subcoding signal is inserted into each word format one bit by one bit and these inserted bits are sequentially transmitted.

In one embodiment of the present invention, a read instruction to a predetermined address is first executed by microcomputer system 18, and this address is a code that indicates the absolute time duration in the Q channel. This address is supplied to system controller 11 through interface unit 17. System controller 11 controls thread drive circuit 6 to cause it to move optical head 4 to a location near a desired pick-up location, while supervising the subcoding signal reproduced by optical head 4. In this example, reproduction is started from a location spaced a few BLOCKs from the desired location, in order to prevent the access operation from not being finished if an error is included in the reproduced subcoding signal and the set subcoding signal is not reproduced. The desired BLOCK is obtained or caught by detecting coincidence of the reproduced subcoding signal with the designated address from the microcomputer system, or in another case by starting the playback from the location near the correct subcoding signal and counting the frame sync signals up to the desired one.

Another possible arrangement is one in which an operating keyboard is added to the digital-to-analog convertor and system controller 11, so that the playback of the compact disc in which stereophonic music signals have been recorded can be enabled by use of the keyboard. Also, it is possible to insert the accessing code signals for which coding processing of the error correction code has been performed in the other R-W channels in the subcoding signals.

Thus, according to the present invention it possible to provide a disc memory device having extremely large memory capacity relative to a conventional flexible magnetic discs and also to provide a device to read out the digital signals on a unit basis that is more suitable for digital data handling.

Additionally, according to the present invention for a disc for reproducing stereophonic musical signals already recorded on a commercially available compact disc, it is possible to record digital data other than the stereophonic musical signals while maintaining the compatibility with the signal format and signal processing in the commercially available system, so that the error correcting method and recording data format and the like are the same. Thus, by adding a data processing section, which might include a microcomputer, a color cathode ray tube, and a speaker, for example, and suitable adaptors to a standard disc player, is possible to playback various picture information and other audio information, thereby enlarging the application range of compact audio discs.

Although illustrative embodiments of the present invention have been described in detail above with reference to the accompanying drawings, it is to be understood that the invention is not limited to those precise embodiments, and that various changes and modifications can be effected therein by one skilled in the art without departing from the scope or spirit of the invention, as defined by the appended claims.

What is claimed is:

1. A method for arranging digital data having definable informational units on a recording medium disc for subsequent access of specific informational units and playback thereof by disc playback apparatus including the steps of:
   recording main digital data in a track on a disc;
   recording subdigital data in the same track on said disc as said main digital data and including in said subdigital data data to selectively reproduce said main digital data;
   selecting a unit of change of said informational units of said main digital data as indicated by said subdigital data;
   playing back at least a part of a selected recorded track of said disc;
   forming a plurality of FRAMEs from said main digital data and corresponding subdigital data;
   arranging a predetermined number of said FRAMEs sequentially in parallel to form one BLOCK of said main digital data;
   selecting a desired informational unit of one of said BLOCKs of said main digital data;
   using said subdigital data in said one of said blocks to access said selected desired informational unit having a resolution of said selected unit of change of said main digital data; and
   outputting said reproduced accessed main digital data.

2. A method according to claim 1, in which the step of setting a predetermined number of said FRAMEs equal to one BLOCK includes the step of setting 98 FRAMEs equal to one BLOCK.

3. A method according to claim 1, in which the step of setting a predetermined number of said FRAMEs equal to one BLOCK includes the steps of setting two FRAMEs equal to one BLOCK.

4. A method according to claim 1, including the further steps of dividing said FRAMEs into ROWs of data and selecting six ROWs of data for each FRAME.

5. A method according to claim 4, including the further steps of identifying each of said BLOCKs by placing selected digital values in first bit positions of the first two ROWS of a first FRAME of each of said BLOCKs.

6. A method according to claim 5, including the further step of identifying alternate FRAMEs of said BLOCK by placing a correspondingly alternate digital value in a first bit position of the first ROW of each of said FRAMEs in said BLOCK.

7. A method for accessing digital data recorded on a record medium disc by playback apparatus in which main digital data in the form of informational units is recorded in a track on a disc and corresponding subdigital data is recorded in the same track on said disc as said main digital data, said subdigital data including timing data for use in selectively accessing said main digital data, comprising the steps of:
   selecting a unit of change of said informational units of said main digital data;
   playing back at least a part of a selected track of said record medium disc;
   reading the subdigital data from the played back track;

forming a plurality of FRAMEs from a predetermined number of said units of change of said main digital data and said subdigital data;

setting a predetermined number of said FRAMEs equal to one BLOCK of said main digital data;

selecting a desired informational unit in one of said BLOCKs of said main digital data;

using said subdigital data that was read from the selected, played back track to access said selected informational unit with an accuracy based on said selected unit of change of said main digital data; and outputting said main digital data based upon correlation between said FRAMEs and said addresses.

8. A method according to claim 7, in which the step of setting a predetermined number of said FRAMEs equal to one BLOCK includes the step of setting 98 FRAMEs equal to one BLOCK.

9. A method according to claim 7, in which the step of setting a predetermined number of said FRAMEs equal to one BLOCK includes the steps of setting two FRAMEs equal to one BLOCK.

10. A method according to claim 7, including the further steps of dividing said FRAMEs into ROWs of data and selecting six ROWs of data for each FRAME.

11. A method according to claim 10, including the further steps of identifying each of said BLOCKs by placing selected digital values in first bit positions of the first two ROWs of a first FRAME of each of said BLOCKs.

12. A method according to claim 11, including the further step of identifying alternate FRAMES of said BLOCK by placing a correspondingly alternate digital value in a first bit position of the first ROW of each of said FRAMEs in said BLOCK.

13. Apparatus for arranging digital data on a record medium disc for subsequent playback and access of specific informational units, said disc having main digital data and corresponding subdigital data recorded thereon in the same track, said subdigital data including data to identify said main digital data, said apparatus comprising:

means for playing back subdigital data and main digital data recorded in selected tracks from said disc;

means for selecting a unit of change of said informational units of said main digital data;

processing means for forming a plurality of FRAMEs from a predetermined number of said units of change of said main digital data and corresponding subdigital data and for arranging sequentially in parallel a predetermined number of said FRAMEs to form one BLOCK of said main digital data;

means for providing an address of one of said BLOCKs of said main digital data;

means for using said subdigital data to access the selected address of said BLOCK; and means for outputting selected BLOCKs of said main digital data based upon said address.

14. Apparatus according to claim 13, in which said processing means sets 98 FRAMEs equal to one BLOCK.

15. Apparatus according to claim 13, in which said processing apparatus sets two FRAMEs equal to one BLOCK.

16. Apparatus according to claim 13, in which said processing means includes means for dividing said FRAMEs into ROWs of data and for selecting six ROWs for each FRAME.

17. Apparatus according to claim 16, further comprising identifying means for identifying each of said BLOCKs by placing selected digital values in first bit positions of the first two ROWs of a first FRAME of each of said BLOCKs.

18. Apparatus according to claim 17, wherein said identifying means identifies alternate FRAMEs of said BLOCK by placing a correspondingly alternate digital value in a first bit position of the first ROW of each of said FRAMEs in said BLOCK.

19. Apparatus for playing back digital data from a record medium disc on which main digital data and subdigital data are recorded in the same track, said subdigital data including data for use in selectively accessing specific informational units of the main digital data, said apparatus comprising:

means for selecting a unit of change of said informational units of said main digital data;

processing means for forming a plurality of FRAMEs from a predetermined number of said units of change of said subdigital data and for arranging sequentially in parallel a predetermined number of said FRAMEs to form one BLOCK of said rain digital data;

means for separating said subdigital data from the played back data;

addressing means for providing an address corresponding to an informational unit in one of said BLOCKs of said main digital data;

means for using said subdigital data to access the provided address in said BLOCK;

output means for selectively outputting BLOCKs of said main digital data based upon correlation between said FRAMEs and said addresses.

20. Apparatus according to claim 19, in which said processing means sets 98 FRAMEs equal to one BLOCK.

21. Apparatus according to claim 19, in which said processing means sets two FRAMEs equal to one BLOCK.

22. Apparatus according to claim 19, further comprising means for dividing said FRAMEs into ROWs of data and selecting six ROWs of data for each FRAME.

23. Apparatus according to claim 22, further including identifying means for identifying each of said BLOCKs by placing selected digital values in first bit positions of the first two ROWs of a first FRAME of each of said BLOCKs.

24. Apparatus according to claim 23, in which said identifying means identifies alternate FRAMEs of said BLOCK by placing a correspondingly alternate digital value in a first bit position of the first ROW of each of said FRAMEs of said BLOCK.

* * * * *